2,601,450

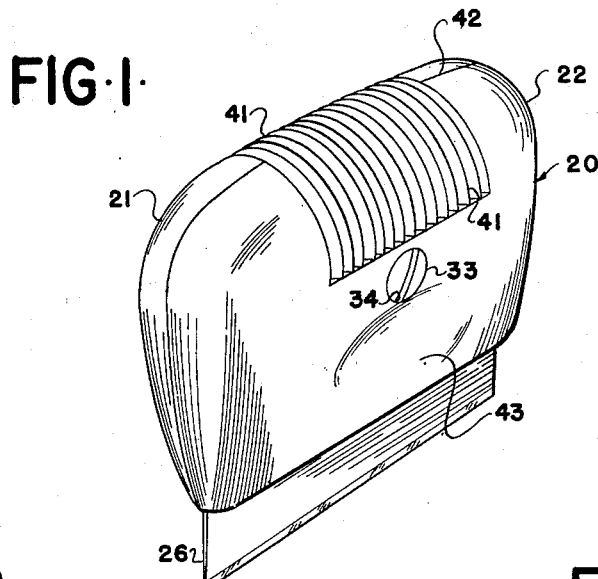
FIG·1·
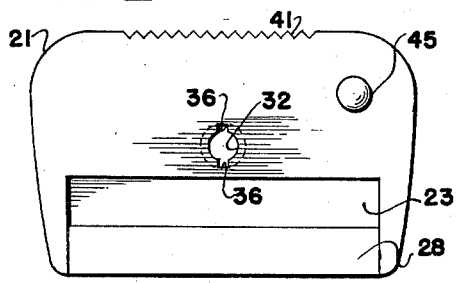
FIG·2·
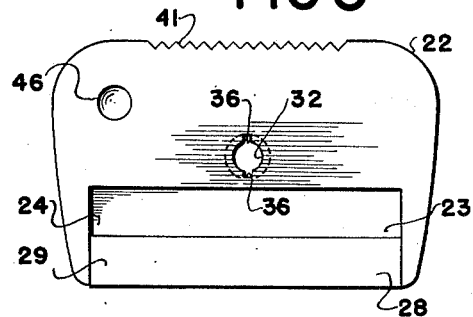
FIG·3·
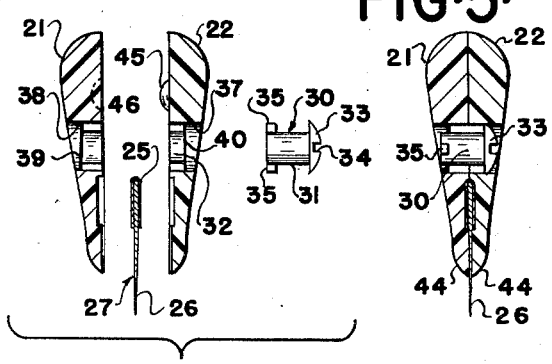
FIG·4·
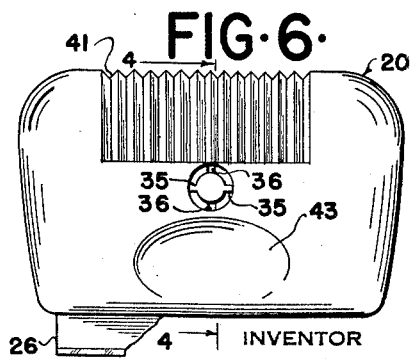
FIG·5· FIG·6·
INVENTOR
HARRY O'NEILL
BY
ATTORNEY Patented June 24, 1952

UNITED STATES PATENT OFFICE 2,601,450

CUTTING IMPLEMENT HOLDER

Harry O'Neill, Garden City, N. Y.

Application July 31, 1950, Serial No. 176,791

2 Claims. (Cl. 30—332)

This invention pertains to a cutting implement holder, and more particularly to a holder for a cutting implement, such as a single edge razor blade.

Devices of the class set forth herein for holding a cutting implement, such as a razor blade, have usually been of a type that were small, in regards to the size of the cutting implement, and the means provided for holding same were not conducive to comfort and handling while operating the device, and further usually provided means which afforded an unnatural hold for operating the cutting implement.

One of the objects and advantages of the invention is to provide a cutting implement holder which fundamentally eliminates the undesirable qualities set forth above wherein an implement holder has a substantially complete form-fitting recess for a single edge cutting implement, which recess has similar cross sectional contours formed in two complemental portions of the holder.

A further advantage of the invention is the provision of an implement holder formed of two substantially similar halves of moulded or pressed material with the cutting implement recesses formed therein, the exterior cross sectional outline of the device providing a shaped body which is sufficiently wide at the top to provide a good hand bearing thereon and with the two portions thereof being tapered inwardly until they merge into opposing sides of the cutting implement or single cutting edge blade.

A further object of the invention is to provide a cutting implement holder of the class set forth formed of two substantially similar sections with aligning features formed as part thereof to facilitate assembling the parts with the cutting implement, and with a pivotal member for adequately securing the parts together after the cutting implement has been disposed therein.

Further and other objects of the invention may be and may become apparent from a perusal of the present disclosure. It is to be understood that certain changes, variations, and modifications may be made therein without departing from the spirit of the appended claims.

In the drawings:

Fig. 1 is a perspective view of the cutting implement holder having a cutting blade properly inserted therein.

Fig. 2 is an inside view of one half the implement holder.

Fig. 3 is an inside view of the opposing half of the implement holder.

Fig. 4 is an exploded sectional view taken substantially along lines 4—4 of Fig. 6.

Fig. 5 is an assembled sectional view taken substantially along lines 4—4 of Fig. 6.

Fig. 6 is a side view, partially shown, of the invention presented in Fig. 1.

Referring to the drawings, there is shown the cutting implement holder 20 having two sides or side portions 21 and 22, which are substantially identical, the differences of which will be later explained in detail.

The two sides 21 and 22 each have an elongated recess 23 and 24, respectively, which are identical, to receive the stiffener channel 25, which is secured to the blade 26, in a conventional manner.

The length, height, and depth of the recesses 23 and 24 are such that when the cutting implement 27, which consists of the stiffener channel 25 and the blade 26, is inserted therein when the device is assembled, will hold the cutting implement in substantially a fixed relation to the holder 20. Recesses 28 and 29, formed in the opposing sides 21 and 22, are substantially the same length as the blade 26, and are of a depth which is substantially one half the thickness of the blade 26.

An adjustment lug 30 has a body portion 31 which is slightly smaller in diameter than the diameter of the apertures 32 so that the body 31 of the lug may be inserted through said apertures 32. A head 33 formed on one end of the adjustment lug has a slot 34 therein to receive a tool, such as a screw driver, for the purpose of turning the lug. A pair of protuberances 35 which are identical with each other are disposed on opposing sides of the body of the lug at the end opposite the head 33. The dimensions of the protuberances 35 are somewhat smaller than the slots 36 formed on opposing sides of the apertures 32 in each of the sides 21 and 22 of the holder 20.

Each of the sides 21 and 22 have additional central apertures 37 and 38, the latter aperture 38 terminating in inclined surfaces or shoulders 39 formed on opposing sides of the slots 36, while the aperture 37 terminates in the shoulder 40 of the aperture 32, which shoulder surface is normal to the axis of the aperture 32.

The underneath surface of the head 33 will engage the shoulder 40, when the lug 30 is inserted in the apertures 32 when the sides 21 and 22 are properly brought together for assembly.

The protuberances 35, after completely passing through the slots 36, will then be slightly beyond the low edges of the shoulder 39 at the point of emergence of the protuberances through their respective slots. The inclined surfaces or shoulders 39 are really two inclined half shoulders formed intermediate the slots 36 so that at the point where the protuberances 35 emerge, after the lug has been inserted, the protuberances will be at the low point of each half the inclined surfaces 39.

Upon rotation of the lug 30, in the proper direction, the protuberances will engage the inclined surfaces of the shoulder 39, and as the lug is continued to be rotated the protuberances will ride up the incline of the shoulder 39 and draw both side portions 21 and 22, tightly, together.

The exploded view in Fig. 4 shows the inclined surface or shoulder 39 which is actually one half of the shoulder about the aperture 32, while the other half of the shoulder would be identical with that shown in Fig. 4.

A plurality of arcuate ribs 41 are formed from the top edge 42, where both halves join, and continue downwardly for approximately, or nearly, half of the exterior surface of the side portions 21 and 22, as shown. These ribs or serrations provide a non-slipping surface which will be engaged by the hand of the user of the device.

An elliptical, symmetrical recess 43 is formed on either side on the exterior surface of side portions 21 and 22, so that the thumb and finger may grip same to hold the device securely in the hand to prevent slipping thereof when in use.

The lower edges 44 of the side portions 21 and 22 are tapered inwardly and merge with the blade 26 substantially midway between the cutting edge of the blade and the lower portion of the stiffener channel 25 as shown in the cross sectional view of Fig. 5.

Aligning means are provided in the invention wherein a protuberance 45 is formed on one of the inner surfaces of one of the side portions, while a complemental recess 46 is formed on the inner surface of the other side portion of the device.

In assembling the invention the protuberance 45 and recess 46 will fit together after the cutting implement 27 is properly placed within the holder. Thereafter, insertion of the lug and rotation thereof will tighten the sides and securely hold them together in an aligned position.

From the foregoing it will be seen that the objectives and advantages of the invention set forth above will be accomplished.

What is claimed as new and desired to be secured by Letters Patent of the United States is:

1. A cutting implement holder for a blade having a stiffening channel, consisting of two substantially similar side portions, each side portion having a pair of interconnected elongated recesses formed therein and adapted to receive substantially one half the thickness of the stiffening channel and blade portion of a cutting implement with the sets of recesses in each side being aligned with one another, each side portion having formed therein an aperture with a pair of communicating slots disposed on opposing sides of each of said apertures, a pair of shoulders formed contiguous with each of said apertures and with each shoulder being contiguous with each pair of communicating slots, one pair of said shoulders having inclined surfaces on opposing sides of said communicating slots, and adjustment means having portions for engaging said inclined surfaces of one pair of said shoulders to draw together and secure said side portions upon rotation of said adjustment means.

2. A cutting implement holder for a blade having a stiffening channel, consisting of two substantially similar side portions, one side portion having a pair of interconnecting elongated recesses formed therein and adapted to receive substantially the thickness of the stiffening channel and blade portion of a cutting implement, each side portion having formed therein an aperture with a pair of communicating slots disposed on opposing sides of each of said apertures a pair of shoulders formed contiguous with each of said apertures and with each shoulder being contiguous with each pair of communicating slots, one pair of said shoulders having inclined surfaces on opposing sides of said communicating slots, and adjustment means having portions for engaging said shoulders to secure together increasingly said side portions upon rotation of said adjustment means.

HARRY O'NEILL.

REFERENCES CITED

The following references are of record in the file of this patent:

UNITED STATES PATENTS

| Number | Name | Date |
|---|---|---|
| 485,264 | Eberhard | Nov. 1, 1892 |
| 1,567,943 | Grush | Dec. 29, 1925 |
| 1,957,663 | Neidhart | May 8, 1934 |
| 2,304,332 | Bodkin | Dec. 8, 1942 |
| 2,321,706 | Salsbury | June 15, 1943 |
| 2,476,339 | Von Opel | July 19, 1949 |